(12) United States Patent
Sawada et al.

(10) Patent No.: US 6,355,351 B1
(45) Date of Patent: Mar. 12, 2002

(54) CATIONICALLY ELECTRODEPOSITABLE COATING MATERIAL

(75) Inventors: Hidenori Sawada; Shigeo Nishiguchi, both of Hiratsuka; Koji Kamikado, Yokohama, all of (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/784,175

(22) Filed: Feb. 16, 2001

(30) Foreign Application Priority Data

Feb. 18, 2000 (JP) ........................................ 2000-041860

(51) Int. Cl.[7] .............................................. B32B 15/08
(52) U.S. Cl. ..................... 428/418; 523/407; 523/411; 523/412; 524/839; 524/840; 525/920
(58) Field of Search .......................... 428/418; 523/407, 523/411, 412; 524/839, 840; 525/920

(56) References Cited

U.S. PATENT DOCUMENTS 4,732,788 A * 3/1988 Guioth .................... 427/388.2
4,987,178 A   1/1991 Shibata et al.
5,021,530 A   6/1991 Yamamoto et al.

* cited by examiner

Primary Examiner—Philip Tucker
Assistant Examiner—D. Aylward
(74) Attorney, Agent, or Firm—Wenderoth, Lind & Ponack, LLP

(57) ABSTRACT

The present invention provides a cationically electrodepositable coating composition capable of forming a coating film which is excellent in both of coating film physical properties such as a chipping resistance and an impact resistance and a corrosion resistance. The composition comprises an amine-modified epoxy resin (A) and a blocked polyisocyanate (B), further comprising 5 to 50 parts by weight of a cationic urethane-modified polymer emulsion (C) per 100 parts by weight of the total of the amine-modified epoxy resin (A) and the blocked polyisocyanate (B) in terms of a solid matter.

28 Claims, No Drawings

CATIONICALLY ELECTRODEPOSITABLE COATING MATERIAL

BACKGROUND OF THE INVENTION

1. Field of the Invention

The present invention relates to a cationically electrodepositable coating composition, more specifically to a cationically electrodepositable coating composition having an excellent chipping resistance and impact resistance and capable of forming a cured coating film which is excellent in a corrosion resistance.

2. Description of the Prior Art

A cationically electrodepositable coating composition is used for wide uses including undercoating for automobiles, and those having various characteristics have so far been developed. Usually, a cationically electrodepositable coating composition comprises an amine-modified epoxy resin as a base resin and a blocked polyisocyanate as a curing component.

On the other hand, salts for melting snow are scattered for preventing freezing in the winter season in cold districts such as North America and Canada. Coating film damage due to stones striking against outside plates such as doors and bonnets is liable to be caused in running of cars in such cold districts. In addition thereto, coating films are exposed to severe corrosive environment originating in scattered salts for melting snow, so that rusts produced on damaged parts become a serious problem. Thus, strongly desired to be developed is a coating material capable of forming a coating film which is excellent in coating film physical properties such as a chipping resistance and an impact resistance and which has a high corrosion resistance.

Proposed as a method for solving the problems described above are a method in which in a cationically electrodepositable coating composition usually used as an undercoating material for a car body, a modifying agent for providing flexibility is introduced into an epoxy resin used as a base resin and/or (blocked) polyisocyanate used as a curing agent; and a method in which coating components are blended with a plasticizing component such as polyol, a soft resin such as a xylene resin and an organic solvent having a high boiling point as additives. However, in the modifying agent-introducing method and the additive-blending method each described above, it is difficult to obtain a cationically electrodepositable coating composition capable of forming a coating film which is excellent in both of coating film physical properties such as a chipping resistance and an impact resistance and a corrosion resistance.

SUMMARY OF THE INVENTION

Intensive researches repeated by the present inventors in order to solve the problems described above have resulted in finding that an electrodepositable coating film is provided with flexibility and elasticity by adding a cationic urethane-modified polymer emulsion to a cationically electrodepositable coating composition and that obtained is a cationically electrodepositable coating composition capable of forming a coating film which is excellent in both of coating film physical properties such as a chipping resistance and an impact resistance and a corrosion resistance by allowing the emulsion to melt in a base resin, a curing agent and other components in baling and allowing it to partially cross-linking with other resin components.

Thus, according to the present invention, provided is a cationically electrodepositable coating composition comprising an amine-modified epoxy resin (A) and a blocked polyisocyanate (B), further comprising 5 to 50 parts by weight of a cationic urethane-modified polymer emulsion (C) per 100 parts by weight of the total of the amine-modified epoxy resin (A) and the blocked polyisocyanate (B) in terms of a solid matter.

The cationically electrodepositable coating composition of the present invention shall be explained below in further details.

DETAILED DESCRIPTION OF THE INVENTION

Amine-modified epoxy resin (A):

Those usually used as a base resin for a cationically electrodepositable coating material can be used as well for the amine-modified epoxy resin (A) in the cationically electrodepositable coating composition of the present invention. To be specific, capable of being given are, for example, (i) an adduct of a polyepoxide compound to primary mono- or polyamine, secondary mono- or polyamine or primary and secondary mixed-polyamine (refer to, for example, U.S. Pat. No. 3,984,299); (ii) an adduct of a polyepoxide compound to secondary mono- or polyamine having a primary amino group which is reduced to ketimine (refer to, for example, U.S. Pat. No. 4,017,438); and (iii) a reaction product obtained by etherification of a polyepoxide compound with a hydroxy compound having a primary amino group which is reduced to ketimine (refer to, for example, Japanese Patent Application Laid-Open No. 43013/1984).

The polyepoxide compound used for producing the amine-modified epoxy resin (A) described above is a compound having at least two epoxy groups in a molecule and is suitably a compound having a number average molecular weight falling in a range of usually at least 200, preferably 400 to 4000 and more preferably 800 to 2000 and an epoxy equivalent falling in a range of usually at least 100, preferably 200 to 2000 and more preferably 400 to 1000. In particular, a compound obtained by reacting a polyphenol compound with epichlorohydrin is preferred. The polyphenol compound which can be used for producing the above polyepoxide compound includes, for example, bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butyl-phenyl)-2,2-propane, bis(2-hy-droxynaphthyl)methane, tetra(4-hydroxyphenyl)-1,1,2,2-ethane, 4,4'-dihydroxydiphenylsulfone, phenol novolak and cresol novolak.

The above polyepoxide compound may be those reacted partly with polyols, polyetherpolyols, polyesterpolyols, polyamide-amines, polycarboxylic acids and polyisocyanate compounds. Further, it may be those graft-polymerized with ε-caprolactone and acryl monomers.

On the other hand, the amine compound which can be added to the polyepoxide compound described above includes, for example, diethylamine, dibutylamine, methybutylamine and diethanolamine. Further, ketimine-reduced blocked products of amine compounds such as diethylenetriamine can be used as well. They each can be used alone or in combination of two or more kinds thereof.

Blocked Polyisocyanate (B):

The blocked polyisocyanate (B) used as a curing agent in the cationically electrodepositable coating composition of the present invention is a compound obtained by blocking substantially all isocyanate groups of polyisocyanate with a volatile blocking agent.

Polyisocyanate is a compound having at least two free isocyanate groups in a molecule and includes aromatic, aliphatic or alicyclic polyisocyanates. To be specific, it includes, for example, 2,4-or 2,6-toluylenediisocyanate or a mixture thereof, p-phenylenediisocyanate, diphenylmethane-4,4'-diisocyanate, polymethylenepolyphenylisocyanate, tetramethylene-diisocyanate, hexamethylenediisocyanate, isophorone-diisocyanate; polyisocyanates obtained by linking a part of the isocyanate groups of the polyisocyanates described above with low molecular diols such as ethylene glycol propylene glycol, 1,6-hexanediol, neopentyl glycol, diethylene glycol, triethylene glycol and 1,4-cyclohexanediol and oligomer diols such as polyethylene glycol, polypropylene glycol, polytetramethylene glycol and polylactonediol or mixtures thereof; adducts of the polyisocyanates described above to polyhydric alcohols such as trimethylolethane and trimethylolpropane, polyester resins (including oil-modified types) of low molecular weights having a functional group which reacts with an isocyanate group, acryl base copolymers and water; buret products of the polyisocyanates described above and copolymers (oligomers) of diisocyanates themselves; equimolar adducts of 2-hydroxypropyl (meth)acrylate to hexamethylenediisocyanate and copolymers comprising as an essential component, vinyl monomers having an isocyanate group and a copolymerizable unsaturated group such as isocyanateethyl methacrylate; and polyisocyanurates having an isocyanurate group and soluble in a nonpolar organic solvent, which is obtained by reacting alkylene-, cycloalkylene- and aralkylene-diisocyanates of $C_2$ to $C_8$ with diols of $C_{10}$ to $C_{40}$ in the presence of an isocyanurate-reducing catalyst.

Among them, diphenylmethane-4,4'-diisocyanate, polymethylenepolyphenylisocyanate, hexamethylenediisocyanate and isophoronediisocyanate are particularly suitable.

On the other hand, the blocking agent is added to an isocyanate group of polyisocyanate to block it, and a blocked polyisocyanate compound is preferably a compound which is stable at a room temperature and which can dissociate the blocking agent in heating at a baking temperature of the coating film, for example, about 100 to about 200° C. to reproduce the free isocyanate group.

The blocking agent satisfying such requisite includes, for example, lactam base compounds such as $\epsilon$-caprolactam and $\gamma$-butyrolactam; oxime base compounds such as methyl ethyl ketoxime and cyclohexanoneoxime; phenol base compounds such as phenol, p-t-butylphenol and cresol; aliphatic alcohols such as n-butanol and 2-ethylhexanol; aromatic alkylalcohols such as phenylcarbitol and methylphenylcarbitol; and ether alcohol base compounds such as ethylene glycol monobutyl ether.

Cationic Urethane-modified Polymer Emulsion (C):

The present invention has a novel characteristic in the point that the cationic urethane-modified polymer emulsion (C) is further added to the cationically electrodepositable coating composition comprising the preceding amine-modified epoxy resin (A) as a base resin and the blocked polyisocyanate (B) as a curing agent.

The cationic urethane-modified polymer emulsion used in the present invention can be produced, for example, by reacting polyisocyanate (a), polyol (b) and monoalkyldialkanolamine (c) with a hydroxyl group-containing polymerizable unsaturated compound (d) to obtain an unsaturated polyurethane resin (e) and using an acid-neutralized product thereof as a high molecular weight reactive emulsifier to emulsion-polymerize a polymerizable unsaturated monomer (f) in an aqueous medium in the presence of the acid-neutralized product and, if necessary, in the coexistence of other emulsifiers.

The polyisocyanate (a) is a compound having at least two isocyanate groups in a molecule and includes aromatic, aliphatic or alicyclic polyisocyanates. To be specific, it includes, for example, 2,4-or 2,6-toluylenediisocyanate or a mixture thereof, p-phenylene-diisocyanate, diphenylmethane-4,4'-diisocyanate, polymethylenepolyphenylisocyanate, tetramethylene-diisocyanate, hexamethylenediisocyanate, isophorone-diisocyanate, dicyclohexylmethane-4,4'-diisocyanate and m- or p-xylylenediisocyanate; buret-modified products or isocyanurate-modified products of the polyisocyanates described above; and polyisocyanates obtained by linking a part of the isocyanate groups of the polyisocyanates described above with low molecular diols such as ethylene glycol, propylene glycol, 1,6-hexanediol, neopentyl glycol diethylene glycol, triethylene glycol and 1,4-cyclohexanediol and oligomer diols such as polyethylene glycol, polypropylene glycol, polytetramethylene glycol and polylactonediol, or mixtures thereof. However, the polyisocyanate (a) shall not be restricted thereto. Among them, hexamethylenediisocyanate and isophoronediisocyanate are particularly suited.

The polyol (b) includes low molecular weight glycols, high molecular weight glycols, polyesterpolyols, polycarbonatepolyols and polyetherpolyols which are usually used in producing polyurethanes. They each can be used alone or may be used in combination of two more kinds thereof For example, low molecular weight glycols can be used in combination with high molecular weight glycols or polyesterpolyols. These polyols (b) have preferably a number average molecular weight falling in a range of usually 62 to 10,000, particularly 62 to 4000.

The monoalkyldialkanolamine (c) has suitably a carbon number falling in a range of 1 to 8, particularly 1 to 4 in an alkyl part and a carbon number falling in a range of 2 to 8, particularly 2 to 4 in an alkanol part. To be specific, it includes, for example, N-methyldiethanolamine, N-ethyldiethanolamine and N-butyldiethanolamine.

The hydroxyl group-containing polymerizable unsaturated compound (d) is a component for introducing a polymerizable unsaturated group into a polyurethane resin to be formed and includes compounds having at least one, preferably 1 to 2 hydroxyl groups and at least one, preferably 1 to 2 polymerizable unsaturated groups in a molecule. To be specific, it includes, for example, hydroxyalkyl (meth) acrylates such as 2-hydroxyethyl (meth)acrylate, hydroxypropyl (meth)acrylate and hydroxybutyl (meth)acrylate; polyalkylene glycol mono(meth)acrylates such as polyethylene glycol mono(meth)acrylate and polypropylene glycol mono(meth)acrylate; $\epsilon$-caprolactone polycondensation products of hydroxyalkyl (meth)acrylates such as 2-hydroxyethyl (meth)acrylate; $\beta$-methyl-$\delta$-valerolactone polycondensation products of hydroxyalkyl (meth)acrylates such as 2-hydroxyethyl (meth)acrylate; other hydroxyl group-containing (meth)acrylates such as glycerol mono (meth)acrylate and glycerol di(meth)acrylate; hydroxyl group-containing allyl compounds such as allyl alcohol, glycerol monoallyl ether and glycerol diallyl ether; and ($C_2$ to $C_4$)alkylene oxide adducts of these compounds (an average addition mole number of the alkylene oxides can fall in a range of usually 2 to 30 moles, preferably 10 to 20 mole).

The unsaturated polyurethane resin (f) can be produced from the polyisocyanate (a), the polyol (b), the monoalkyldialkanolamine (c) and the hydroxyl group-containing polymerizable unsaturated compound (d) each described above by means of a conventionally known polyurethane synthetic process. For example, it can be produced by reacting the respective components (a) to (d) described above with each other in a suitable organic solvent. The organic solvent used in this case is suitably an organic solvent which is inactive to an isocyanate group and which has a large affinity to water, such as, for example, dioxane, acetone, methyl ethyl ketone, methyl isobutyl ketone, N-methylpyrrolidone and tetrahydrofuran.

Further, monohydric alcohols including, for example, alkanols such as methanol, ethanol and propanol and ether alcohols such as ethylene glycol monoethyl ether may be used, if necessary, for the purpose of blocking excessive isocyanate groups.

Use proportions of the polyisocyanate (a), the polyol (b), the monoalkyldialkanolamine (c) and the hydroxyl group-containing polymerizable unsaturated compound (d) shall not strictly be restricted and can be changed according to characteristics desired to the resulting polyurethane resin. In general, an equivalent ratio of the isocyanate groups to the hydroxyl groups in the whole reaction components falls preferably in a range of 1:1 to 1:3, particularly 1:1 to 1:2.5 and more particularly 1:1 to 1:2.

A use amount of the hydroxyl group-containing polymerizable unsaturated compound (d) which is used for the purpose of introducing a polymerizable unsaturated group into the resulting polyurethane resin falls suitably in a range of usually 0.01 to 1 equivalent, particularly 0.02 to 0.8 equivalent and more particularly 0.03 to 0.5 equivalent.

In the reaction described above, the respective components of the polyisocyanate (a), the polyol (b), the monoalkyldialkanolamine (c) and the hydroxyl group-containing polymerizable unsaturated compound (d) may be reacted either in one lot or in order in a multistage. For example, the polyisocyanate (a) and a part of the polyol (b) are reacted with the monoalkyldialkanolamine (c) to form an isocyanate-end prepolymer, and then the remainder of the polyol (b) is reacted with the hydroxyl group-containing polymerizable unsaturated compound (d), whereby the intended unsaturated polyurethane resin can be produced.

The reaction can usually be carried out at a temperature of usually about 40 to about 180° C., preferably about 60 to about 130° C.

Also, in order to accelerate the reaction described above, capable of being used are amine base catalysts such as triethylamine, N-ethylmorpholine and triethylenediamine, and a tin base catalysts such as dibutyltin dilaurate and dioctyltin dilaurate which are usually used in a urethane-reducing reaction. Further, hydroquinone, hydroquinone monomethyl ether and p-benzoquinone can be used as well in order to prevent the hydroxyl group-containing polymerizable unsaturated compounds (d) themselves from being polymerized during the urethane-reducing reaction.

The unsaturated polyurethane resin (e) produced in such a manner as described above can have an amine value falling in a range of usually 5 to 200 mg KOH, particularly 10 to 180 mg KOH and more particularly 15 to 150 mg KOH per g of the resin solid matter. Further, the above unsaturated polyurethane resin can have a number average molecular weight failing in a range of usually 500 to 20,000, preferably 1,000 to 10,000.

Next, a polymerizable unsaturated monomer is emulsion-polymerized in an aqueous medium in the presence of this unsaturated polyurethane resin (e) or, if necessary, in the coexistence of other emulsifiers, whereby the intended cationic urethane-modified polymer emulsion (f) is obtained.

This emulsion polymerization can be carried out by, for example, a method in which the unsaturated polyurethane resin (e) described above is added to an aqueous medium containing an acid-neutralizing agent and, if necessary, other emulsifiers while stirring and mixed to neutralize an amino group of the above resin and disperse the above resin, and then the polymerizable unsaturated monomer (f) is added to carry out emulsion polymerization; a method in which an acid-neutralizing agent, the unsaturated polyurethane resin (e) and, if necessary, other emulsifiers are continuously dropwise added and mixed to neutralize an amino group of the above resin and disperse the above resin, and then the polymerizable unsaturated monomer (f) is added to carry out emulsion polymerization; a method in which the unsaturated polyurethane resin is neutralized in advance with an acid, and then an acid-neutralized product of this the unsaturated polyurethane resin (e) is added to an aqueous medium, if necessary, together with other emulsifiers and mixed and dispersed, followed by adding the polymerizable unsaturated monomer (f) to carry out emulsion polymerization; and a method in which the unsaturated polyurethane resin (e) is dispersed in an aqueous medium, if necessary, together with other emulsifiers, and an acid-neutralizing agent and the polymerizable unsaturated monomer (f) are added to the dispersion thereof to carry out neutralization of the resin (e) and emulsion polymerization of the monomer (f) at the same time.

Deionized water is usually used for the aqueous medium and, if necessary, deionized water containing a small amount of a water-miscible organic solvent can be used as well.

Capable of being used as the acid-neutralizing agent are organic or inorganic acids forming salts which react with an amino group of the unsaturated polyurethane resin (e) to produce a cation in an aqueous medium, and they include suitably aliphatic carboxylic acids such as, for example, formic acid, acetic acid, propionic acid, lactic acid, succinic acid, glutaric acid and adipic acid. A use amount of the neutralizing agent falls suitably in a range of usually 0.5 to 2.0 equivalent, particularly 0.7 to 1.3 equivalent per equivalent of an amino group in the resin (e).

Further, the other emulsifiers used if necessary include anionic surfactants and nonionic surfactants which are usually used in emulsion-polymerizing polymerizable unsaturated monomers. These surfactants each can be used alone or in combination of two or more kinds thereof.

Emulsion polymerization of the polymerizable unsaturated monomer (f) is started by adding a polymerization initiator. Capable of being used as the polymerization initiator are, for example, conventionally known ones including azo base initiators such as azoisovaleronitrile and peroxides such as ammonium persulfate, potassium per-sulfate and t-butyl hydroperoxide. A reducing agent such as formaldehyde sodium sulfoxylate can be used in combination, if necessary, for the purpose of lowering the polymerization temperature.

In the emulsion polymerization described above, the unsaturated polyurethane resin (e) can be used in a range of usually 10 to 80% by weight, preferably 20 to 60% by weight and more preferably 25 to 50% by weight based on the total solid matters of the unsaturated polyurethane resin (e) and the polymenzable unsaturated monomers.

The polymerizable unsaturated monomer (f) used in the emulsion polymerization described above includes, for example, hydroxyalkyl esters of (meth)acrylic acid having 2 to 8 carbon atoms such as 2-hydroxyethyl (meth)acrylate and hydroxypropyl (meth)acrylate; vinyl aromatic compounds such as styrene and vinyltoluene; (meth)acrylic acid, maleic acid, crotonic acid, β-carboxyethyl acrylate, 2-acrylamide-2-methylpropanesulfonic acid, allylsulfonic acid, styenesulfonic acid, sulfoethyl methacrylate, and sodium salts and ammonium salts thereof; adducts of amines to (meth)acrylamide, dimethyl-aminopropyl(meth) acrylamide, dimethylaminoethyl (meth)acrylate and glycidyl (meth)acrylate; polyethylene glycol (meth)acrylate; N-vinylpyrrolidone, ethylene, butadiene, chloroprene, vinyl propionate, vinyl acetate and (meth)acrylonitrile; and alkyl or cycloalkyl esters of (meth)acrylic acid having 2 to 8 carbon atoms such as methyl (meth)acrylate, ethyl (meth) acrylate, propyl (meth)acrylate, butyl (meth)acrylate, 2-ethylhexyl (meth)acrylate, cyclohexyl (meth)acrylate, lauryl (meth)acrylate and isobutyl (meth)acrylate. They each can be used alone or in combination of two or more kinds thereof.

Polymer particles contained in the resulting cationic urethane-modified polymer emulsion have a particle diameter falling in a range of usually 0.02 to 0.5 $\mu$m.

Cationically Electrodepositable Coating Composition:

The cationically electrodepositable coating composition of the present invention comprises the amine-modified epoxy resin (A), the blocked polyisocyanate (B) and the cationic urethane-modified polymer emulsion (C) each described above.

A blending ratio of the amine-modified epoxy resin (A) to the blocked polyisocyanate (B) in the coating composition of the present invention can fall in a range of usually 90/10 to 40/60, preferably 85/15 to 50/50 and more preferably 80/20 to 60/40 in terms of a weight ratio of (A)/(B). Also, the cationic urethane-modified polymer emulsion (C) can be added in a range of 5 to 50 parts by weight, preferably 10 to 40 parts by weight and more preferably 15 to 30 parts by weight per 100 parts by weight of the total of the amine-modified epoxy resin (A) and the blocked polyisocyanate (B) in terms of a solid matter.

The cationically electrodepositable coating composition of the present invention can be produced by, for example, dispersing a mixture comprising the amine-modified epoxy resin (A), the blocked polyisocyanate (3) and, if necessary, other additives in an aqueous form and blending the resulting aqueous dispersion with the cationic urethane-modified polymer emulsion.

The mixture described above can be dispersed in an aqueous form by, for example, neutralizing an amino group of the amine-modified epoxy resin (A) contained in the above mixture with an acid in an aqueous medium. The acid used for this neutralization includes organic and inorganic acids such as formic acid, acetic acid, propionic acid, lactic acid, citric acid, malic acid, sulfamic acid and phosphoric acid. A use amount of these acids is suitably such an amount that a neutralization equivalent of the amino group described above falls in a range of usually 0.1 to 1.2, preferably 0.3 to 1. Further, the neutralization equivalent is preferably controlled so that an average particle diameter of the dispersed particles contained in the resulting aqueous dispersion falls in a range of 0.01 to 0.2 $\mu$m, preferably 0.05 to 0.15 $\mu$m.

The aqueous medium used in the aqueous dispersion described above is usually water or a mixture of water and a water-miscible organic solvent, and the aqueous dispersion can be improved in stability, if necessary, by blending a small amount of a water-immiscible organic solvent. The water-miscible organic solvent which can be used in this case includes, for example, ethylene glycol monoethyl ether, ethylene glycol monopropyl ether, ethylene glycol monobutyl ether, diethylene glycol monoethyl ether, butanol, methyl ethyl ketone and diacetone alcohol The water-immiscible organic solvent includes, for example, toluene, xylene, methyl isobutyl ketone and 2-ethylhexanol.

The cationically electrodepositable coating composition of the present invention comprises the amine-modified epoxy resin (A), the blocked polyisocyanate (B) and the cationic urethane-modified polymer emulsion (C) as essential components. Further, it can suitably comprise, if necessary, additives for a coating composition such as a pigment, a surfactant, a UV absorber and a curing accelerator. These additives for a coating composition can be blended with the coating composition in the form of a dispersion paste together with water and a resin for dispersion.

The pigment described above includes, for example, color pigments such as titanium dioxide, carbon black and red iron oxide; rust preventive pigments such as basic lead silicate, aluminum phosphomolybdate, aluminum tripolyphosphate, strontium chromate, zinc chromate, lead chromate, and bismuth-containing compounds such as bismuth hydroxide, basic bismuth silicate, bismuth gallate, bismuth lactate, bismuth silicate, bismuth triphenyl bismuth trioxide, bismuth nitrate, bismuth benzoate, bismuth citrate and bismuth oxycarbonate; and extender pigments such as silica, precipitated barium sulfate, aluminum silicate, precipitated calcium carbonate, talc, clay and mica.

The curing accelerator used for elevating a curing property of the coating film includes tin compounds, for example, organic tin compounds such as dibutyltin oxide and dioctyl dioxide; and aliphatic or aromatic carboxylic acid salts of dialkyltin such as dibutyltin dilaurate, dioctyltin dilaurate, dioctyltin benzoateoxy, dibutyltin benzoateoxy and dioctyltin dibenzoate.

The cationically electrodepositable coating composition of the present invention can be electrodepositably coated, for example, by adding deionized water, if necessary, to the above composition to control the solid matter concentration in a range of usually 10 to 30% by weight, preferably 15 to 25% by weight, then partially evaporate the organic solvent and water while stirring at a coating composition temperature of about 25 to about 35° C., preferably about 28 to about 32° C. to prepare an electrodepositable coating bath, dipping therein an article to be coated as a cathode and applying an electric current for about 2 to about 4 minutes at a bath temperature of about 15 to about 35° C., preferably about 20 to about 30° C. under applying a voltage of 100 to 400 V. After electrodepositablly coating, the article to be coated is taken out from the bath and, if necessary, washing with UF (ultrafiltration) filtrate or deionized water to thereby remove the surplus coating composition and then baked at a temperature of usually about 100 to about 200° C., preferably about 140 to about 180° C. for 10 to 90 minutes, preferably 30 to 60 minutes, whereby the electrodepositablly coating film can be cured.

A thickness of the electrodepositablly coating film falls suitably in a range of usually 5 to 50 $\mu$m, particularly 10 to 40 $\mu$m. Capable of being used as the article to be coated are, for example, those obtained by further subjecting a cold rolled steel plate and a zinc-plated steel plate which are used for car bodies to chemical conversion treatment with zinc phosphate.

Thus, an electrodepositablly coating film which is excellent not only in coating film physical properties such as a chipping resistance and an impact resistance but also a corrosion resistance such as a salt spraying property can be formed by using the cationically electrodepositable coating composition of the present invention.

EXAMPLES

The present invention shall further specifically be explained below with reference to examples, but the scope of the present invention shall not be restricted only to these examples. "Part" and "%" mean "part by weight" and "% by weight" unless otherwise described.

Production Example 1

Production of Amine-modified Epoxy Resin

A reactor equipped with a thermometer, a thermostat, a stirrer and a reflux condenser was charged with 380 parts of Epikote 828EL (epoxy resin, epoxy equivalent: about 190, manufactured by Oil Shell Epoxy Co., Ltd.) and 137 parts of bisphenol A, and 0.26 part of N-benzylmethylamine was added thereto while maintaining 100° C. by heating. Then, the temperature was elevated up to 120° C. by heating to react them for about 2 hours. Thereafter, 120 parts of methyl isobutyl ketone was blended and cooled down to 80° C., and blended were 14 parts of methyl isobutyl diketimine (a 75% solution of methyl isobutyl ketone) of diethylenetriamine and 57 parts of N-ethylmonoethanolamine. The temperature was elevated up to 100° C. by heating to react them for about 5 hours, and then 41 parts of propylene glycol monomethyl ether was added thereto to obtain an amine-modified epoxy resin (A-1) having a solid content of about 78%.

Production Example 2

Production of Blocked Polyisocyanate

A reactor equipped with a thermometer, a thermostat, a stirrer, a reflux condenser and a dropping device was charged with 20 parts of methyl isobutyl ketone as a solvent and then 35 parts of tolylenediisocyanate (TDI) and heated to elevate the temperature up to 60° C. Then, 45 parts of ethylene glycol monoisopropyl ether was charged by dropwise adding at 60° C. in 2 hours, and the solution was heated to elevate the temperature up to 80° C. to react them until the isocyanate group-remaining rate determined by a titration method became zero, whereby a blocked polyisocyanate (B-1) having a solid content of about 77% was obtained.

Production Example 3

Production of Unsaturated Polyurethane Resin

A reactor equipped with a thermometer, a thermostat, a stirrer, a reflux condenser and a dropping device was charged with 660 parts of methyl isobutyl ketone as a solvent and then 1400 parts of polypropylene glycol (average molecular weight: 700) and 357 parts of N-methyldiethanolamine and heated to elevate the temperature up to 80° C. Then, 1332 parts of isophoronediisocyanate (IPDI) was dropwise added at 80° C. in 30 minutes. After finishing dropwise adding, 116 parts of 2-hydroxyethyl acrylate was added when the isocyanate value became 30 or less (solid content), and the temperature was maintained at 80° C. Then, 468 parts of diethylene glycol monoethyl ether was added when the isocyanate value became 15 or less, and the temperature was maintained at 80° C. as it was to react them until the isocyanate value became 2 or less, whereby an unsaturated polyurethane resin (e-1) having a solid content of 77% was obtained.

Production Example 4

Production of Unsaturated Polyurethane Resin

A reactor equipped with a thermometer, a thermostat, a stirrer, a reflux condenser and a dropping device was charged with 310 parts of methyl isobutyl ketone as a solvent and then 490 parts of polypropylene glycol (average molecular weight: 700) and 155 parts of N-methyldiethanolamine and heated to elevate the temperature up to 80° C. Then, 666 parts of isophoronediisocyanate (IPDI) was dropwise added at 80° C. in 30 minutes. After finishing titration, 116 parts of 2-hydroxyethyl acrylate was added when the isocyanate value became 70 or less (solid content), and the temperature was maintained at 80° C. Then, 290 parts of diethylene glycol monoethyl ether was added when the isocyanate value became 32 or less, and the temperature was maintained at 80° C. as it was to carry out the reaction until the isocyanate value became 2 or less, whereby an unsaturated polyurethane resin (e-2) having a solid content of 77% was obtained.

Production Example 5

Production of Unsaturated Polyurethane Resin

A reactor equipped with a thermometer, a thermostat, a stirrer, a reflux condenser and a titrating device was charged with 570 parts of methyl isobutyl ketone as a solvent and then 960 parts of polypropylene glycol (average molecular weight: 400) and 309 parts of N-methyldiethanolamine and heated to elevate the temperature up to 80° C. Then, 1332 parts of isophoronediisocyanate (IPDI) was dropwise added at 80° C. in 30 minutes. After finishing dropwise adding, 116 parts of 2-hydroxyethyl acrylate was added when the isocyanate value became 35 or less (solid content), and the temperature was maintained at 80° C. Then, 419 parts of diethylene glycol monoethyl ether was added when the isocyanate value became 17 or less, and the temperature was maintained at 80° C. as it was to react them until the isocyanate value became 2 or less, whereby an unsaturated polyurethane resin (e-3) having a solid content of 77% was obtained.

Production Example 6

Production of Unsaturated Polyurethane Resin

A reactor equipped with a thermometer, a thermostat, a stirrer, a reflux condenser and a dropping device was charged with 660 parts of methyl isobutyl ketone as a solvent and then 1400 parts of polypropylene glycol (average molecular weight: 700) and 357 parts of N-methyldiethanolamine and heated to elevate the temperature up to 80° C. Then, 1008 parts of hexamethylenediisocanate (HMDI) was dropwise added at 80° C. in 30 minutes. After finishing dropwise adding, 116 parts of 2-hydroxyethyl acrylate was added when the isocyanate value became 33 or less (solid content), and the temperature was maintained at 80° C. Then, 379 parts of diethylene glycol monoethyl ether was added when the isocyanate value became 16 or less, and the temperature was maintained at 80° C. as it was to react them until the isocyanate value became 2 or less, whereby an unsaturated polyurethane resin (e-4) having a solid content of 77% was obtained.

Production Example 7

Production of Cationic Urethane-modified Polymer Emulsion

A reactor equipped with a thermometer, a thermostat, a stirrer, a reflux condenser and a dropping device was charged with 100 parts of deionized water and 1.0 part of "Nonipol 100" (nonionic surfactant, manufactured by Sanyo Chemical Industrial Ltd.) and maintained at 80° C. after substituted with nitrogen. Then, the unsaturated polyurethane resin (e-1) prepared in Production Example 3 was used to prepare a pre-emulsion (1) having the following composition, and the emulsion was dropwise added to the reactor described above in 3 hours. This solution was maintained at 85° C. for 2 hours after finishing dropwise adding to obtain a cationic urethane-modified polymer emulsion (C-1) having a solid content of 30% by weight.
Composition of the Pre-emulsion (1):

| | |
|---|---|
| Deionized water | 114 parts |
| 77% unsaturated polyurethane resin (e-1) | 65 parts |
| Styrene | 15 parts |
| N-Butyl acrylate | 30 parts |
| 2-Hydroxyethyl acrylate | 5 parts |
| Acetic acid | 3 parts |
| VA-086 (polymerization initiator manufactured by Wako Pure Chemicals Ind. Co., Ltd. | 0.5 part |

Production Example 8

Production of Cationic Urethane-modified Polymer Emulsion

The same procedure as in Production Example 7 was carried out to obtain a cationic urethane-modified polymer emulsion (C-2) having a solid content of 30% by weight, except that the same amount of the 77% unsaturated polyurethane resin (e-2) obtained in Production Example 4 was substituted for the 77% unsaturated polyurethane resin (e-1) used in preparing the pre-emulsion (1) in Production Example 7 to prepare a pre-emulsion (2).

Production Example 9

Production of Cationic Urethane-modified Polymer Emulsion

The same procedure as in Production Example 7 was carried out to obtain a cationic urethane-modified polymer emulsion (C-3) having a solid content of 30% by weight, except that the same amount of the 77% unsaturated polyurethane resin (e-3) obtained in Production Example 5 was substituted for the 77% unsaturated polyurethane resin (e-1) used in preparing the pre-emulsion (1) in Production Example 7 to prepare a pre-emulsion (3).

Production Example 10

Production of Cationic Urethane-modified Polymer Emulsion

The same procedure as in Production Example 7 was carried out to obtain a cationic urethane-modified polymer emulsion (C-4) having a solid content of 30% by weight, except that the same amount of the 77% unsaturated polyurethane resin (e-4) obtained in Production Example 6 was substituted for the 77% unsaturated polyurethane resin (e-1) used in preparing the pre-emulsion (1) in Production Example 7 to prepare a pre-emulsion (4).

Production Example 11

Production of Cationic Urethane-modified Polymer Emulsion

The same procedure as in Production Example 7 was carried out to obtain a cationic urethane-modified polymer emulsion (C-5) having a solid content of 30% by weight, except that the composition of the pre-emulsion used for preparing the cationic urethane-modified polymer emulsion in Production Example 7 was changed to the following composition of a pre-emulsion (5).
Composition of the Pre-emulsion (5)

| | |
|---|---|
| Deionized water | 123 parts |
| 77% unsaturated polyurethane resin (e-1) | 32.5 parts |
| Styrene | 23 parts |
| N-Butyl acrylate | 45 parts |
| 2-Hydroxyethyl acrylate | 7 parts |
| Acetic acid | 1.5 part |
| VA-086 (polymerization initiator manufactured by Wako Pure Chemicals Ind. Co., Ltd. | 0.75 part |

Production Example 12

Production of Cationic Urethane-modified Polymer Emulsion

The same procedure as in Production Example 7 was carried out to obtain a cationic urethane-modified polymer emulsion (C-6) having a solid content of 30% by weight, except that the composition of the pre-emulsion used for preparing the cationic urethanemodified polymer emulsion in Production Example 7 was changed to the following composition of a pre-emulsion (6).
Composition of the Pre-emulsion (6):

| | |
|---|---|
| Deionized water | 114 parts |
| 77% unsaturated polyurethane resin (e-1) | 65 parts |
| Methyl methacrylate | 20 parts |
| N-Butyl acrylate | 15 parts |
| 2-Hydroxyethyl acrylate | 15 parts |
| Acetic acid | 3 parts |
| VA-086 (polymerization initiator manufactured by Wako Pure Chemicals Ind. Co., Ltd. | 0.5 part |

Production Example 13

Production of Polyurethane Resin

A reactor equipped with a thermometer, a thermostat, a stirrer, a reflux condenser and a dropping device was charged with 660 parts of methyl isobutyl ketone as a solvent and then 1400 parts of polypropylene glycol (average molecular weight: 700) and 357 parts of N-methyldiethanolamine and heated to elevate the temperature up to 80° C. Then, 1332 parts of isophoronediisocyanate (IPDI) was dropwise added at 80° C. in 30 minutes. After finishing dropwise adding, 611 parts of diethylene glycol monoethyl ether was added when the isocyanate value became 30 or less (solid content), and the temperature was maintained at 80° C. as it was to react them until the isocyanate value became 2 or less, whereby a polyurethane resin (g) having a solid content of 77% was obtained.

Production Example 14

Production of Cationic Urethane-modified Polymer Emulsion

The same procedure as in Production Example 7 was carried out to obtain a cationic urethane-modified polymer emulsion (C-7) having a solid content of 30% by weight, except that the same amount of the 77% unsaturated polyurethane resin (g) obtained in Production Example 13 was substituted for the 77% unsaturated polyurethane resin (e–1) used in preparing the pre-emulsion (1) in Production Example 7 to prepare a pre-emulsion (7).

Composition of the Pre-emulsion (7)

| | |
|---|---|
| Deionized water | 114 parts |
| 77% polyurethane resin (g) | 65 parts |
| Styrene | 15 parts |
| N-Butyl acrylate | 30 parts |
| 2-Hydroxyethyl acrylate | 5 parts |
| Acetic acid | 3 parts |
| VA-086 (polymerization initiator manufactured by Wako Pure Chemicals Ind. Co., Ltd. | 0.5 part |

Production Example 15

Production of Cationic Acryl Emulsion

A reactor equipped with a thermometer, a thermostat, a stirrer, a reflux condenser and a dropping device was charged with 50 parts of methyl isobutyl ketone as a solvent and heated at 105° C. while introducing nitrogen gas thereinto, and dropwise added thereto in 3 hours was a mixture of 10 parts of diethylaminoethyl acrylate, 70 parts of n-butyl acrylate and 20 parts of 2-hydroxyethyl acrylate as polymerizable unsaturated monomers and 4.0 parts of 2,2'-azobis(2-methylbutyrobitrile) as a radical polymerization initiator.

Then, after left standing at 105° C. for one hour, 0.5 part of 2,2'-azobis(2-methylbutyrobitrile) and 5 parts of methyl isobutyl ketone were further dropwise added thereto in one hour, and the solution was left standing at 105° C. for one hour to obtain an acryl copolymer solution. Next, the acryl copolymer solution was slowly added to a cylindrical stainless vessel charged with deionized water and acetic acid while sufficiently stirring to emulsify them, whereby a cationic acryl emulsion (C–8) having a solid content of 30% by weight was obtained.

Production of Pigment-dispersed Paste:

Mixed were 5.83 parts of a 60% quaternary chlorinated epoxy resin, 14.5 parts of titan white, 0.4 part of carbon black, 7.0 pats of an extender pigment, 2.0 parts of bismuth hydroxide and deionized water to obtain a pigment-dispersed paste having a solid content of 50.0% by weight.

EXAMPLES AND COMPARATIVE EXAMPLES

Example 1

Added to 70 parts (solid matter: 54.6 parts) of the amine-modified epoxy resin (A–1) obtained in Production Example 1 and 30 parts (solid matter: 23.1 parts) of the blocked polyisocyanate resin (B–1) obtained in Production Example 2 was 1.33 part of 90% acetic acid, and the mixture was sufficiently stirred to prepare a dissolved vanish. Deionized water was slowly added thereto to obtain a cationically electrodepositable emulsion (D). Added to 260.3 parts (solid matter: 78.1 parts) of this cationically electrodepositable emulsion (D) were 78 parts (solid matter: 23.4 parts) of the cationic urethanemodified polymer emulsion (C–1) obtained in Production Example 7 and 70 parts (solid matter: 35 parts) of the pigment-dispersed paste, and then deionized water was added thereto to adjust the solid content to 20% by weight to obtain a cationically electrodepositable coating composition No. 1.

Examples 2 to 6

The same procedure as in Example 1 was repeated to obtain the cationically electrodepositable emulsion (D). Added to 260.3 parts (solid matter: 78.1 parts) of this cationically electrodepositable emulsion (D) were 78 parts (solid matter: 23.4 parts) of the cationic urethane-modified polymer emulsions (C–2) to (C–6) obtained in Production Examples 7 to 12 and 70 parts (solid matter: 35 parts) of the pigment-dispersed paste, and then deionized water was added thereto to adjust the solid content to 20% by weight to obtain cationically electrodepositable coating compositions No. 2 to No. 6.

Comparative Examples 1 and 2

The same procedure as in Example 1 was repeated to obtain the cationically electrodepositable emulsion (D). Added to 260.3 parts (solid matter: 78.1 parts) of this cationically electrodepositable emulsion (D) were each 78 parts (solid matter: 23.4 parts) of the cationic urethane-modified polymer emulsion (C–7) and the cationic acryl emulsion (C–8) obtained in Production Examples 14 and 15 and 70 parts (solid matter: 35 parts) of the pigment-dispersed paste, and then deionized water was added thereto to adjust the solid content to 20% by weight to obtain cationically electrodepositable coating compositions No. 7 and No. 8.

Comparative Example 3

The same procedure as in Example 1 was repeated to obtain the cationically electrodepositable emulsion (D). Added to 260.3 parts (solid matter: 78.1 parts) of this cationically electrodepositable emulsion (D) was 70 parts (solid matter: 35 parts) of the pigment-dispersed paste, and then deionized water was added thereto to adjust the solid content to 20% by weight to obtain a cationically electrodepositable coating composition No. 9.

The blending compositions of these cationically electrodepositable coating compositions are shown in the following Table 1.

TABLE 1

| | | coating composition blend | | | | | | | | | |
|---|---|---|---|---|---|---|---|---|---|---|---|
| | | | Example | | | | | | Comparative Example | | |
| | | 1 | 2 | 3 | 4 | 5 | 6 | 1 | 2 | 3 |
| Cationically electrodepositable coating material No. | | No. 1 | No. 2 | No. 3 | No. 4 | No. 5 | No. 6 | No. 7 | No. 8 | No. 9 |
| Cationically electrodepositable | Amine-modified epoxy resin | (A-1) 70 parts (solid matter: 54.6 parts) | | | | | | | | |
| | Blocked polyisocyanate | (B-1) 30 parts (solid matter: 23.1 parts) | | | | | | | | |

TABLE 1-continued coating composition blend

|  |  | Example | | | | | | Comparative Example | | |
|---|---|---|---|---|---|---|---|---|---|---|
|  |  | 1 | 2 | 3 | 4 | 5 | 6 | 1 | 2 | 3 |
| emulsion (D) | Neutralizing agent/diluent water | 90% acetic acid/deionized water | | | | | | | | |
| Cationic urethane- | Kind | (C-1) | (C-2) | (C-3) | (C-4) | (C-5) | (C-6) | (C-7) | (C-8) | — |
| modified polymer | Pre-emulsion No | (1) | (2) | (3) | (4) | (5) | (6) | (7) | — | — |
| emulsion | Unsaturated polyurethane resin | (e-1) | (e-2) | (e-3) | (e-4) | (e-1) | (e-1) | (g) | — | — |
| Pigment-dispersed paste | | 70 parts (solid matter: 35.0 parts) | | | | | | | | |
| Diluent water | | Deionized water | | | | | | | | |

Preparation of Cationically Electrodepositable Coating Compositions

A stainless steel-made cylindrical open can was charged with the cationically electrodepositable coating compositions No. 1 to No. 9, and the surplus solvents contained in the coating compositions were removed while stirring in an open state at a liquid temperature of 30° C. for 2 days to adjust the solid contents to 20% by weight with deionized water. The coating compositions were subjected to the following electrodepositable coating test.

Electrodepositable Coating Test

A zinc-plated steel plate of 0.8×150×70 mm which was subjected to chemical conversion treatment with Palbond #3020 (trade name, a zinc phosphate treating agent manufactured by Nihon Parkerizing Co., Ltd.) was dipped in the respective cationically electrodepositable coating compositions obtained in the examples and the comparative examples described above, and this was used as a cathode to carry out electrodepositable coating. Then, the coated article was pulled up from the coating composition bath, washed with water and then baked at a baking temperature of 170° C. for a baking time of 20 minutes by means of an electric hot air dryer. The performance test results of the test coated plates thus obtained are shown in the following Table 2. The performance tests were carried out according to the following methods.

TABLE 2

Coating film performance

|  | Example | | | | | | Comparative Example | | |
|---|---|---|---|---|---|---|---|---|---|
|  | 1 | 2 | 3 | 4 | 5 | 6 | 1 | 2 | 3 |
| Corrosion resistance (remark 1) | ○ | ○ | ○ | ○ | ○ | ○ | Δ | Δ | ○ |
| Chipping resistance (remark 2) | ○ | ○ | ○ | ○ | ○ | ○ | Δ | × | × |
| Impact resistance, Du Pont method (remark 3) | 50 | 50 | 50 | 50 | 50 | 50 | 30 | 20 | 10 |

TEST METHODS

Corrosion Resistance (Remark 1):

Crosscut scratches were provided on the electrodepositably coating films of the resulting respective electrodepositably coated plates by means of a knife so that the scratches reached the bases, and the plates were subjected to a 840 hours brine-spraying resistance test according to JIS Z-2371 to evaluate a width of rust and blister originating from the knife scratches according to the following criteria:

○: maximum width of rust and blister is less than 2 mm (one side) from the cut part Δ: maximum width of rust and blister is 2 mm or more and less than 3 mm (one side) from the cut part, and blisters are observed to be produced on the whole coated surface X: maximum width of rust and blister is 3 mm or more from the cut part, and blisters are observed to be produced on the whole coated surface Chipping Resistance (Remark 2):

An intermediate coating material TP-65 (trade name, an aninoallid intermediate coating composition manufactured by Kansai Paint Co., Ltd.) was applied in a thickness of 35 μm on the test coated plate by spray coating and baked at 40° C. for 20 minutes. Then, a top coating composition Neo Amilac 6000 (trade name, an aminoalkid top coating composition manufactured by Kansai Paint Co., Ltd.) was applied thereon in a thickness of 35 μm by spray coating and baked at 140° C. for 20 minutes to provide three coats. It was tested on the following conditions by means of a Gravelo examination machine.

Test Conditions:

Test equipment:

Q-G-R Gravelometer (product of Q-Panel Co., Ltd.)

Stones to be blown: No. 7 crushed stones

Amount of stones to be blown: 50 g

Blown air pressure: 0.392 MPa (4 kgf/cm$^2$)

Temperature in testing: −20° C.

Blowing angle to coated surface: 90 degree

Evaluation Criteria:

○: only top coated surface is scratched

Δ: scratches on the top coated surface and peeling between the coating composition and the material are observed X: scratches almost reach the material Impact Resistance, Du Pont Method (Remark 3):

The test coated plate was put in an air-conditioned chamber of a temperature of 20±1° C. and a humidity of 75±2% for 24 hours. Then, the plate was interposed between a pedestal having a prescribed size and an impact pin having a diameter of 1.27 cm (½ inch) which were installed to a Du Pont impact tester with the coated face turned upward, and a deadweight of 1 kg was fallen onto the impact pin to determine a maximum height at which cracking and peeling of the coating film were not caused by impact.

What is claimed is:

1. A cationically electrodepositable coating composition comprising an amine-modified epoxy resin (A) and a blocked polyisocyanate (B), further comprising 5 to 50 parts by weight of a cationic urethane-modified polymer emulsion (C) per 100 parts by weight of the total of the amine-modified epoxy resin (A) and the blocked polyisocyanate (B) in terms of a solid matter.

2. The composition as described in claim 1, wherein the amine-modified epoxy resin (A) is selected from the group consisting of (i) an adduct of a polyepoxide compound to primary mono- or polyamine, secondary mono- or polyamine or primary and secondary mixed-polyamine, (ii) an adduct of a polyepoxide compound to secondary mono- or polyamine having a primary amino group which is reduced to ketimine and (iii) a reaction product obtained by etherification of a polyepoxide compound with a hydroxy compound having a primary amino group which is reduced to ketimine.

3. The composition as described in claim 1, wherein the blocked polyisocyanate (B) is obtained by blocking polyisocyanate selected from the group consisting of diphenylmethane-4,4'-diisocyanate, polymethylene-polyphenylisocyanate, hexamethylenediisocyanate and isophoronediisocyanate with a blocking agent.

4. The composition as described in claim 1, wherein the cationic urethane-modified polymer emulsion (C) is obtained by emulsion-polymerizing a polymerizable unsaturated monomer (f) in an aqueous medium in the presence of an acid-neutralized product of an unsaturated polyurethane resin (e) obtained by reacting polyisocyanate (a), polyol (b) and monoalkyldialkanolamine (c) with a hydroxyl group-containing polymerizable unsaturated compound (d) or, if necessary, in the coexistence of other emulsifiers.

5. The composition as described in claim 4, wherein the polyisocyanate (a) is selected from the group consisting of 2,4- or 2,6-toluylenediisocyanate or a mixture thereof, p-phenylenediisocyanate, diphenylmethane-4,4'-diisocyanate, polymethylenepolyphenylisocyanate, tetramethylenediisocyanate, hexamethylenediisocyanate, isophoronediisocyanate, dicyclohexylmethane-4,4'-diisocyanate and m- or p-xylylenediisocyanate; buret-modified products and isocyanurate-modified products of the polyisocyanates described above; and polyisocyanates obtained by linking a part of the isocyanate groups of the polyisocyanates described above with low molecular diols or oligomer diols and mixtures thereof.

6. The composition as described in claim 4, wherein the polyisocyanate (a) is selected from the group consisting of hexamethylenediisocyanate and isophoronediisocyanate.

7. The composition as described in claim 4, wherein the polyol (b) is selected from the group consisting of high molecular weight glycols, polyesterpolyols, polycarbonatepolyols, polyetherpolyols and mixtures thereof.

8. The composition as described in claim 4, wherein the polyol (b) has a number average molecular weight of 62 to 10,000.

9. The composition as described in claim 4, wherein the monoalkyldialkanolamine (c) has 1 to 8 carbon atoms in an alkyl part and 2 to 8 carbon atoms in an alkanol part.

10. The composition as described in claim 4, wherein the monoalkyldialkanolamine (c) is selected from the group consisting of N-methyldiethanolamine, N-ethyldiethanolamine and N-butyldiethanolamine.

11. The composition as described in claim 4, wherein the hydroxyl group-containing polymerizable unsaturated compound (d) is a compound having 1 to 2 hydroxyl groups and 1 to 2 polymerizable unsaturated groups.

12. The composition as described in claim 4, wherein the hydroxyl group-containing polymerizable unsaturated compound (d) is selected from the group consisting of 2-hydroxyethyl (meth)acrylate, hydroxypropyl (meth)acrylate, hydroxybutyl (meth)acrylate, polyethylene glycol mono(meth)acrylate, polypropylene glycol mono(meth)-acrylate, ε-caprolactone polycondensation products of 2-hydroxyethyl (meth)acrylate, β-methyl-δ-valerolactone polycondensation products of 2-hydroxyethyl (meth)acrylate, glycerol mono(meth)acrylate, glycerol di(meth)acrylate, allyl alcohol, glycerol monoallyl ether, glycerol diallyl ether, and ($C_2$ to $C_4$)alkylene oxide adducts of these compounds.

13. The composition as described in claim 4, wherein the polyisocyanate (a), the polyol (b), the monoalkyldialkanolamine (c) and the hydroxyl group-containing polymerizable unsaturated compound (d) are reacted in such a proportion that an equivalent ratio of the isocyanate groups to the hydroxyl groups in these (a) to (d) components falls in a range of 1:1 to 1:3.

14. The composition as described in claim 4, wherein the hydroxyl group-containing polymerizable unsaturated compound (d) is used in a range of 0.01 to 1 equivalent per equivalent of an isocyanate group of the polyisocyanate (a).

15. The composition as described in claim 4, wherein the unsaturated polyurethane resin (e) is obtained by reacting the polyisocyanate (a) and a part of the polyol (b) with the monoalkyldialkanolamine (c) to form an isocyanate-end prepolymer and then reacting the remainder of the polyol (b) with the hydroxyl group-containing polymerizable unsaturated compound (d).

16. The composition as described in claim 4, wherein the unsaturated polyurethane resin (e) has an amine value falling in a range of 5 to 200 mg KOH per g of the resin solid matters.

17. The composition as described in claim 4, wherein the unsaturated polyurethane resin (e) has an amine value falling in a range of 10 to 180 mg KOH per g of the resin solid matters.

18. The composition as described in claim 4, wherein the unsaturated polyurethane resin (e) has a number average molecular weight falling in a range of 15 to 150.

19. The composition as described in claim 4, wherein the emulsion polymerization is carried out by a method in which the unsaturated polyurethane resin (e) described above is added to an aqueous medium containing an acid-neutralizing agent and, if necessary, other emulsifiers while stirring and mixed to neutralize an amino group of the above resin and disperse the above resin and then the polymerizable unsaturated monomer (f) is added to carry out emulsion polymerization; a method in which an acid-neutralizing agent, the unsaturated polyurethane resin (e) and, if necessary, other emulsifiers are continuously dropwise added and mixed to neutralize an amino group of the above resin and disperse the above resin and then the polymerizable unsaturated monomer (f) is added to carry out emulsion polymerization; a method in which the unsaturated polyurethane resin (e) is neutralized in advance with an acid-neutralizing agent and then an acid-neutralized product of this unsaturated polyurethane resin (e) is added to an aqueous medium, if necessary, together with other emulsifiers and mixed and dispersed, followed by adding the polymerizable unsaturated monomer (f) to carry out emulsion polymerization; or a method in which the unsaturated polyurethane resin (e) is dispersed in an aqueous medium, if necessary, together with other emulsifiers and in which an acid-neutralizing agent and the polymerizable unsaturated monomer (f) are added to the dispersion to carry out neutralization of the resin (e) and emulsion polymerization of the monomer (f) at the same time.

20. The composition as described in claim 4, wherein the unsaturated polyurethane resin (e) is used in a range 10 to 80% by weight based on the total solid matters of the unsaturated polyurethane resin (e) and the polymerizable unsaturated monomers.

21. The composition as described in claim 4, wherein the polymerizable unsaturated monomer (f) is selected from the group consisting of hydroxyalkyl esters of (meth)acrylic acid having 2 to 8 carbon atoms such as 2-hydroxyethyl (meth)acrylate and hydroxypropyl (meth)acrylate; vinyl aromatic compounds such as styrene and vinyltoluene; (meth) acrylic acid, maleic acid, crotonic acid, β-carboxyethyl acrylate, 2-acrylamide-2-methylpropanesulfonic acid, allylsulfonic acid, styrenesulfonic acid, sulfoethyl methacrylate, and sodium salts and ammonium salts thereof; adducts of amines to (meth)acrylamide, dimethylaminopropyl(meth) acrylamide, dimethylaminoethyl(meth)acrylamide and glycidyl (meth)acrylate; polyethylene glycol (meth)acrylate; N-vinylpyrrolidone, ethylene, butadiene, chloroprene, vinyl propionate, vinyl acetate and (meth)acrylonitrile; and alkyl or cycloalkyl esters of (meth)acrylic acid having 2 to 8 carbon atoms such as methyl (meth)acrylate, ethyl (meth) acrylate, propyl (meth)acrylate, butyl (meth)acrylate, 2-ethylhexyl (meth)acrylate, cyclohexyl (meth)acrylate, lauryl (meth)acrylate and isobutyl (meth)acrylate.

22. The composition as described in claim 1, wherein a blending ratio of the amine-modified epoxy resin (A) to the blocked polyisocyanate (B) falls in a range of 90/10 to 40/60 in terms of a weight ratio of (A)/(B).

23. The composition as described in claim 1, wherein a blending ratio of the amine-modified epoxy resin (A) to the blocked polyisocyanate (B) falls in a range of 85/15 to 50/150 in terms of a weight ratio of (A)/(B).

24. The composition as described in claim 1, comprising the cationic urethane-modified polymer emulsion (C) in a range of 5 to 50 parts by weight per 100 parts by weight of the total of the aminemodified epoxy resin (A) and the blocked polyisocyanate (B) in terms of a solid matter.

25. The composition as described in claim 1, comprising the cationic urethane-modified polymer emulsion (C) in a range of 10 to 40 parts by weight per 100 parts by weight of the total of the amine-modified epoxy resin (A) and the blocked polyisocyanate (B) in terms of a solid matter.

26. A production process for the cationically electrodepositable coating composition as described in claim 1, characterized by dispersing a mixture comprising an amine-modified epoxy resin (A), a blocked polyisocyanate (B) and, if necessary, other additives in an aqueous form and blending the resulting aqueous dispersion with a cationic urethane-modified polymer emulsion.

27. An electrodepositable coating bath prepared using the cationically electrodepositable coating composition as described in claim 1.

28. An article coated with the cationically electrodepositable coating composition as described in claim 1.

* * * * *